United States Patent
Kitano

[11] Patent Number: 6,048,186
[45] Date of Patent: Apr. 11, 2000

[54] DRIVING APPARATUS COMPRISING MODIFIED GEAR SHAPE ELLIPTIC GEAR WHEELS

[76] Inventor: Akitoshi Kitano, 505, 9-6-42 Akasaka, Minato-ku, Tokyo, Japan, 107

[21] Appl. No.: 08/929,270

[22] Filed: Sep. 12, 1997

[30] Foreign Application Priority Data

Sep. 13, 1996 [JP] Japan .................................. 8-243076

[51] Int. Cl.[7] .................. F04C 2/18; G01F 3/08
[52] U.S. Cl. .................. 418/190; 418/206.5; 73/261
[58] Field of Search .................. 418/190, 206.5; 73/261

[56] References Cited

U.S. PATENT DOCUMENTS

| | | | |
|---|---|---|---|
| 231,939 | 9/1880 | Shedd | 418/206.5 |
| 2,897,765 | 8/1959 | Kitano | 418/206.5 |
| 5,454,702 | 10/1995 | Weidhass | 418/206.5 |

*Primary Examiner*—John J. Vrablik
*Attorney, Agent, or Firm*—Jacobson, Price, Holman & Stern, PLLC

[57] ABSTRACT

A pair of elliptic gear wheels to be installed in a metering chamber casing of positive displacement type flow meters and have a modified gear wheel and the change of gear form of an effective gearing pressure angle of an involute gear form side of long radius and of an elimination of trapping phenomenon of cycloid gear form of short radius of wheels. This pair of gear wheels has super precision measuring functions and excellent repeatability, by utilizing a computer which compensates flow rate errors instantaneously and send signals for indicating corrected values. Meshing of the pair of wheels at a top of an involute gear form on a middle portion of a pitch circle can keep meshing of the pair of wheels and a cycloid gear form side of short radius eliminates trapping phenomenon. This pair of modified gear wheels has features that metering errors caused by the trapping phenomenon between meshed gear teeth will be eliminated by an effect of the cycloid gear form and the involute gear form side of long radius keeps meshing of each coupled gear wheel.

3 Claims, 3 Drawing Sheets

006,048,186

DRIVING APPARATUS COMPRISING MODIFIED GEAR SHAPE ELLIPTIC GEAR WHEELS

BACKGROUND OF THE INVENTION

This invention relates to improvements in a driving apparatus comprising elliptic gear wheels and has for its objective a modified elliptic gear wheel driving apparatus wherein the change in a gearing pressure angle of the gear wheels caused by the rotation thereof is reduced so as to relieve actual gearing pressure between the gear wheels, and said gear wheels are not only kept at a good gearing state by preventing trapping between meshed gear teeth and causing a scoring phenomenon, but also driving conditions are improved by increased gear meshing with constant pressure angle and torque so as to eliminate a pressure load on the gear face of a short axis side at higher rotation speed.

A gear face of a major axis side, formed of an involute shape, can be kept meshing on a lower rotation speed without out of meshing.

In the old elliptic gear wheels, in which both sides of a gear shape have a same form such as an involute gear shape or a cycloid gear shape, problems exist of trapping or out of meshing.

Whereas, according to this invention, in order to eliminate trapping between meshed gear teeth and also meshing gear rotors can be kept transfering torque of each of the rotors.

Conventional technology: A rotation body of an elliptic gear wheel type flow meter has involute gears or cycloid gears set up on a pich line. Both pitch lines of rotors are mashed with each other rotate naturally without slip. Coupled rotors can be installed in a measuring chamber in which a liquid to be measured is filled up and the rotor can be rotated. In this way, fluid liquid is measured by counting of a rotation of the rotors.

A rotor of conventional involute gear teeth type has a defect of wearing by a scoring phenomenon, especially in the case of non-lubrication. A strong pressure by trapping will be added on surfaces of meshed gear teeth.

Such worn rotors can no longer indicate precise flow rate. A characteristic curve shows increased error.

In a flow meter installation of coupled rotors of an involute gear form, a pressure angle of meshed gear rotors keeps a constant value in rotation and a back rush between both meshed teeth keeps constant.

A trapping space occurs when rotation changes to a high speed from a low speed and, a point that contacts a tooth form changes. Therefore, liquid trapped in the space is returned to a side of an entrance. When rotor speeds change to a high speed, an inertia of the rotor changes and affects the effectiveness.

Although a characteristic curve of flow meter shows a singular decrease by this phenomenon, a rotor settled with cycloid gear form and the like eliminates such defect and shows an excellent characteristic character.

A rotor in which a cycloid gear form settled on a pitch line rotates mutually can eliminate such trapping by an addendum or addendum of gear form.

A pressure angle mutually meshed on top of a gear tooth and/or a bottom of a gear form on a pitch line distance is larger compared with that of the pitch point and thus a clearance between meshing gear forms are increased. An increased angle of meshing gear teeth point of the rotor against a designed backlash of gear rotors causes a time lag for conversion of meshing and a leak of fluid increases. Thus an error is increased.

A torque of a meshed gear rotor is effective in low speed. A momentum of inertia is effective work when rotating speed of rotor is higher speed. A speed of conversion of meshing is about 100 rpm to 150 rpm.

SUMMARY OF THE INVENTION

This invention consists of a driving apparatus comprising modified elliptic gear wheels characterized by that at the polar coordinates, it is assumed that x indicates an independent variable mentioned in radian, the value of n indicates 2, 3 and 4, a, b and c indicate the number regarding the length, d indicates a positive number from zero to 1, and $\mu$ indicates the number determined by a, b, c and d, then the length of vector $\rho 1$ of a first curved line is obtained by the following formula;

$$\rho_1 = a + \cos nx \left( \frac{c \cdot d^2 |\sin nx|}{(1 - d^2 \cos^2 nx)^2} - b \right) \quad \text{(I)}$$

also, the directional angle $\theta 1$ of the vector 1 is obtained by the following formula;

$$\theta_1 = \frac{1}{\mu} \int \frac{dx}{\rho_1} \quad \text{(II)}$$

Next, the length of vector $\rho 2$ of a second curved line is obtained by the following formula, $$\rho_2 = a - \cos nx \left( \frac{c \cdot d^2 |\sin nx|}{(1 - d^2 \cos^2 nx)^2} - b \right) \quad \text{(III)}$$

also, the directional angle $\theta 2$ of the vector $\rho 2$ is obtained by the following formula $$\theta_2 = \frac{1}{\mu} \int \frac{dx}{\rho_2} \quad \text{(IV)}$$

and when the first curved line or the like prepared by the formulas (I) and (II) and the second curved line or the like prepared by the formulas (III) and (IV) are engaged to each other so as to form respective pitch lines, the sum of the vectors of the first and the second curved lines at points on the same arc-length in the same direction measured from the contact point of said two curved lines is kept at a constant, and also the sum of angles at the respective arc sides forming between each of tangential lines and arc of the vectors is kept at an angle of 180 degrees; and each tooth of said gear wheels is further modified so as to cut down the crown of the tooth at the short axial part but not to produce any cut out portion on the roots of the tooth at the long axial part, or that the center line passed through the center of each of the teeth forms at the long axial part is transposed into an outer side of the pitch line and that at the short axial part is transposed into an inner side of the pitch line so as to avoid the interference between the teeth thereby the thickness of the tooth is increased, said two gears formed as above described being arranged and enclosed in a casing so as to cooperate with each other as a driving member. This driving apparatus may be utilized as a main component in a flow meter and the like.

BRIEF DESCRIPTION OF THE DRAWINGS

In order to facilitate the understanding of this invention, it will now be described with reference to the accompanying drawings which show a preferred embodiment of this invention, in which.

DETAILED DESCRIPTION OF THE PREFERRED EMBODIMENTS

Gears G are formed on a elliptic pitch line P, which is modified from a true ellipse (TE) such that the pitch line in a region of a minor axis extends closer to the center (O) than the true ellipse and in a region of a major axis extends closer to the center than the true ellipse, in which a gear form A faced to a short radius Rs is formed in a cycloid curve and the like form, and an opposite side gear form B faced on to the major radius Rl of said gear is formed as an involute curve and the like form.

As rotors are rotated in a low speed mutually both long axes of the rotors is paralleled, both pitch lines touch at a middle point of each pitch line.

A rotor, in which a cycloid gear form settled on pitch line so as to rotate mutually can eliminate such trapping by an addendum or dedendum of gear form.

Figure 1:
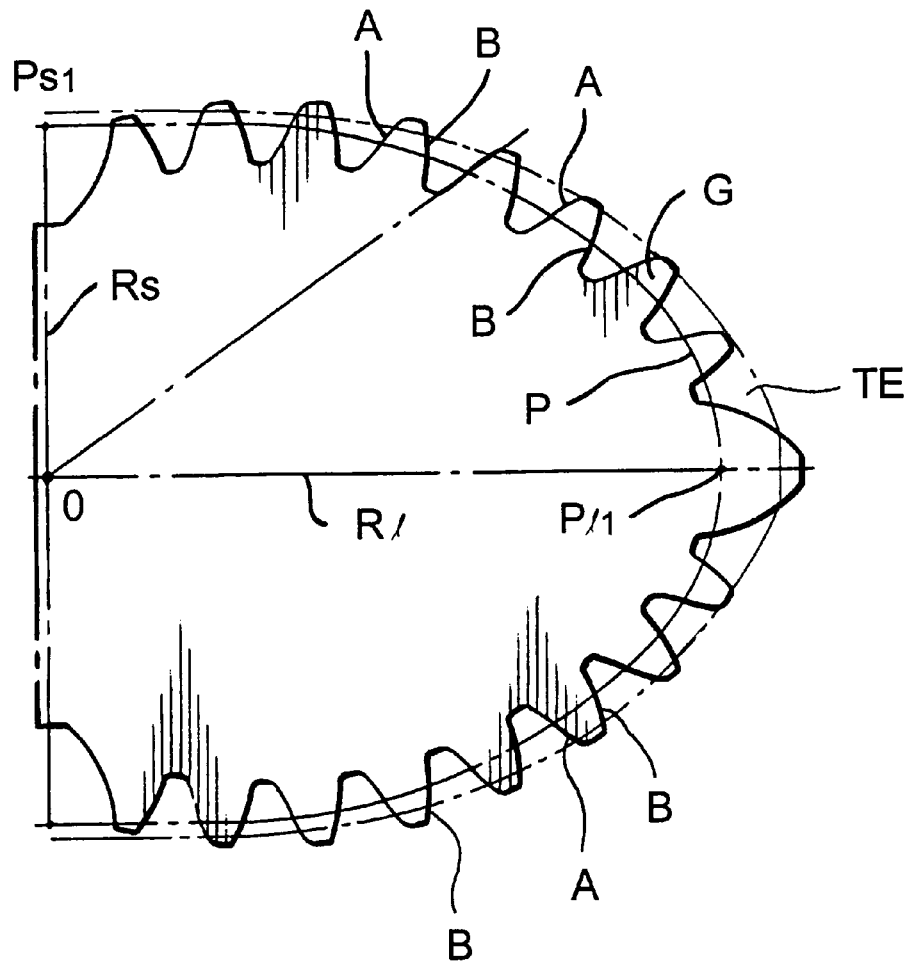
FIG. 1 shows gear forms of an elliptic gear wheel.
Figure 3:
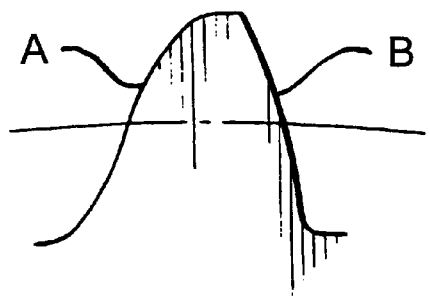
FIG. 3 shows an enlarged gear tooth, and FIG. 4 schematically illustrates two gears $A_1$, $A_2$ having respective centers $O_1$, $O_2$, forming a driving pump or flow meter.
Figure 2:
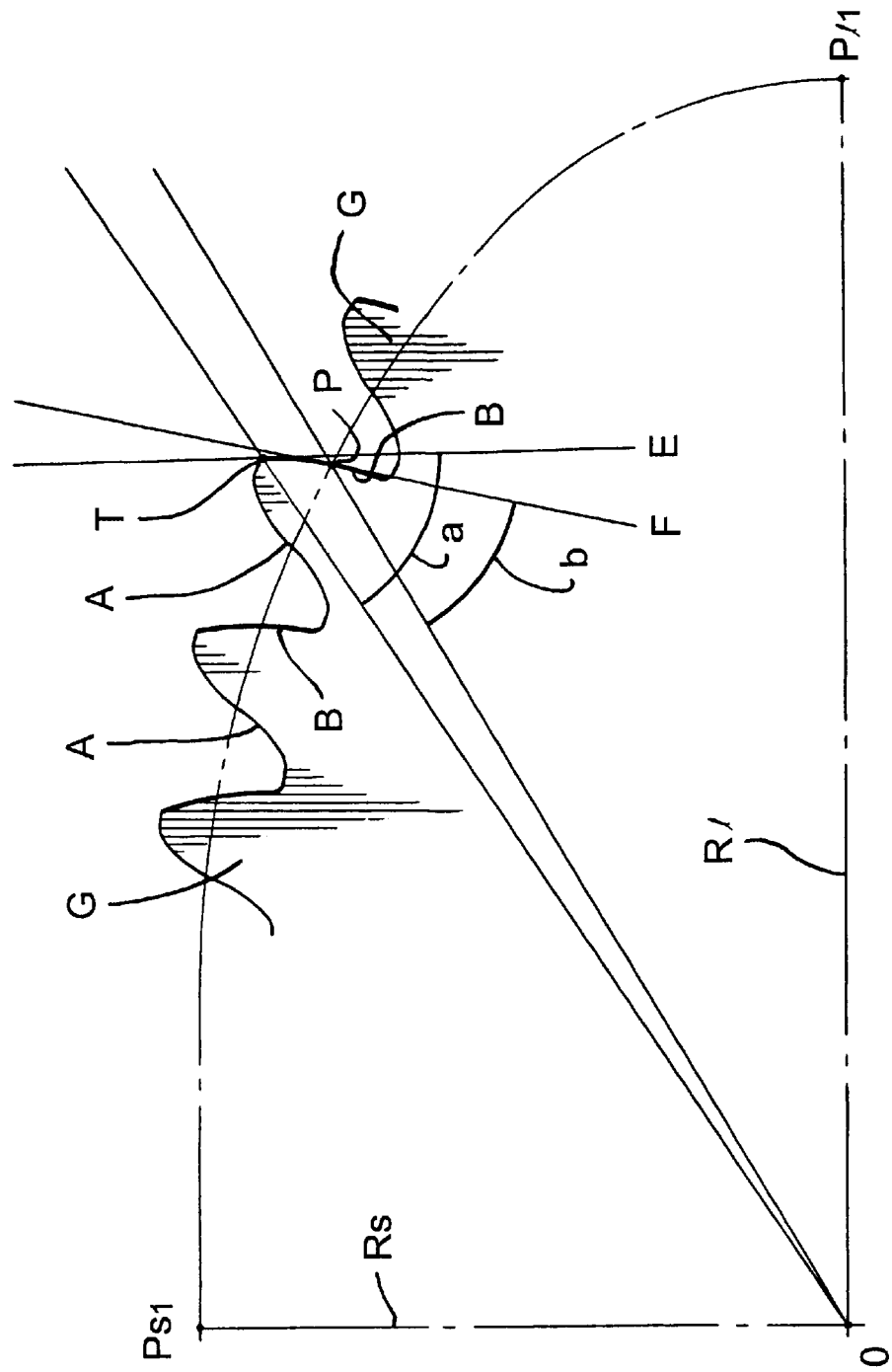
FIG. 2 shows a gear form.
Figure 4:
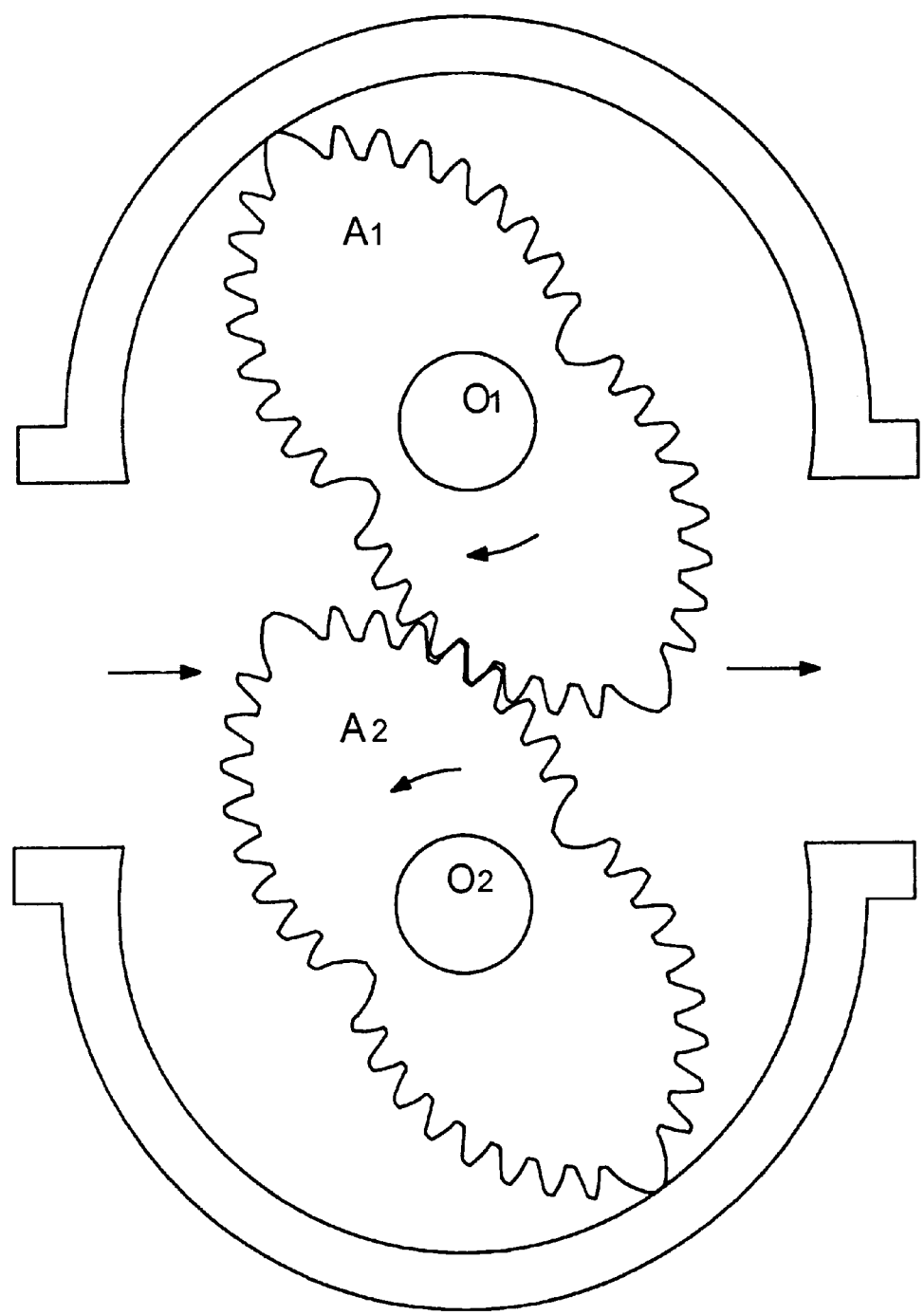

FIG. 2 shows that the gear form is set up on a middle portion of pitch Pm line between the short axis and the major axis. Main feature of this invention; in said gear G form, a pressure angle $\angle a$ (=$\angle OTE$) where O is the gear center, T is the tip of the gear and E is a line lying on a tangent to tip T, is larger than angle $\angle b$ (=$\angle OPF$) where O is the gear center, P lies on the elliptic line, and F lies tangentially to gear form B, with which torque by meshing rotors transmit each other at low rotation speed.

A pressure angle mutually meshed on a top of gear tooth and or a bottom of gear form on a pitch line distance from a larger compared with that of the pitch point and thus a clearance between meshing gear forms are increased. An increased angle of meshing gear teeth point of the rotor against a designed back lash of gear rotors causes a time lag for conversion of meshing and a leak of fluid increases. Thus an error is increased.

A torque of meshed gear the rotor is effective in low speed. A momentum of inertia is effective work when rotating speed of the rotor is high. A speed of conversion of meshing is about 100 rpm to 150 rpm.

As rotors are rotated in low speed mutually both long axes of the rotors is paralleled, both pitch lines touch at a middle point of each pitch line.

For a case of such phenomenon, a gear rotor of cycloid tooth form or of a similar tooth form, a quantity of leaking in comparison to that of above mentioned involute teeth form is large because of above mentioned reason.

In a case of a flow meter of involute gear rotor, leakage is smaller than that of cycloid gear rotor, but it has a problem of the trapping phenomenon.

For a relevant instrumental machine, a more remarkable progress is obtained by electronic technology.

Electric insulation fluids can be measured by a positive displacement flow meter having movable parts.

A purpose of this invention is for a reform of an electromechanical meter that it is added to an electronic technology.

For the main part of conventional flow meter does not have repeatability. It was impossible to show a measurement function and expensive precision depending on electronic technology.

It was found that it is impossible to indicate a measuring function of a precision depending on electronic technology.

This invention offers a technology that to improve a measuring function of elliptic gear rotor designed of combined involute and cycloid form with which eliminated defects of elliptic gear rotors using for gear type flow meters.

It is needed to be guaranteed an accuracy less than 0.1 percent, a flow meter has to be measeured less than an error of one thousandth of a low rate to be measured in piping. Utilization field with respect to an industry: A pair of elliptic gear rotors to mesh with each other mutually and installed in a measuring chamber of positive displacement type flow meters, in which said elliptic gear designed for improved performance measuring character. An inventive purpose at a utilization field with respect to an industry is, to consider 0.1 percent precisions that it guarantees as a high accuracy.

The character of a main body of flow meter and an electronic double compensation micro computer unit is secured by constituent elements shows exact amount of flow at all times.

A measuring function of this meter can contribute to industry technology.

This invented gear form is indispensable for the double compensation micro computer system. As the double compensation system, in which metering error is compensated using coefficient, factors of temperature versus volume and temperature versus viscosity of liquids, a flow meter installed with this gear can be calculated with high accuracy flow rate, and satisfies conditions of measuring accuracy and repeatabitily of the positive displacement type flow meters.

The flow meter installed on a pair of invented gear rotors shows linearity of characteristic curve. Small and uniform clearances between meshing gear rotors prove successful smooth rotation without resistance.

With this, the gear form trapping phenomenon is eliminated, durability of gears will be increased and repeatability is improved.

Accuracy of flow meter is secured by high delivery ratio of elliptic gear rotors and trapping phenomenon is elliminate by cycloid gear form on the side of short axis. An addendum part of said involute gear form on a side of major axis secures positive gear meshing and gives smooth rotation of rotors.

As a gear rotor manufactured by a wire cutting machine have slight displacements from designed curvatures, a pair of meshed gear rotors shuld be treated by a rapping process. The coupled pair of gear form treated by the rapping process has slight displacements of concave and convex surface. With said coupled gears can be rotated without damping and keeps small and uniform back lash with each other, a leakage from a metering chamber can be kept to a minimum.

As an inertia of elliptic gear rotors effective at high speed, high pressure load is added on meshed gear face, an inovolute gear form causes trapping phenomenon and wears gear face, but cycloid gear form does not put such a heavy load on it without trapping. The involute gear form side of a major axis keeps meshing with an opposite gear rotor so as to rotate each other by torque at low speed rotation.

Secured accuracy of 0.1 percent means an error or leak of one thousandth per flow to be measured. Therefore, a crescent shape volume as a measure to be calculated should be kept at a constant volume. The cycloid or similar gear shape eliminates pressure load on meshed gear teeth and scoring phenomenon caused by trapping. Scoring on meshed gear teeth will affect an accuracy of flow meters. Thereas high accuracy of an elliptic gear flow meter is assured by repeatability for a long operation.

Several test machines installed on this invented gear rotors made of stainless steel showed very good repeatability at high speed of 880 rpm for 5000 hours of running time. The invented gear rotor shows very good durability. After such a severe condition by water test, the flow meter showed a high accuracy, because gear face does not wear under such a severe condition.

This invented rational elliptic gear rotor applied features of involute gear form and cycloid gear form elliminates defects of a conventional elliptic gear type flow meters.

This invented elliptic gear form to be installed in positive flow meters together with said double compensation micro computer, in which compensation factor correlated with temperature of a expansion factor of materials of meter body and pipings is applied.

The double compensation micro computer combined with a flow meter installed with this inventive gear rotors will be demonstrate the best ability of metering of flow.

What I claim is:

1. In a driving pump or flow meter, the combination of a first gear and second gear identical to each other and both mounted for rotation about their centers and operatively positioned with their teeth in centers and operatively positioned with their teeth in mesh for all angular positions;

each of said gears being of modified elliptical form such that a pitch line of each gear in a region of a minor axis extends closer to the center than a true ellipse pitch line and a pitch line of each gear in a region of a major axis extends closer to the center than said true ellipse pitch line; and said first and second gears functioning as impellers to drive fluid through said pump or flow meter;

a gear shape form side facing the major axis being an involute form, and a gear shape form side facing the minor axis being a cycloid gear form.

2. The combination as set forth in claim 1, wherein the gear teeth in the region of the major axis are wider along the pitch line than the teeth in the region of the minor axis.

3. The combination as set forth in claim 1, wherein said gear shape form side facing the major axis is solely an involute form and said gear shape form side facing the minor axis is solely a cycloid gear form.

* * * * *